United States Patent
Wu

(10) Patent No.: US 6,540,146 B2
(45) Date of Patent: Apr. 1, 2003

(54) SCANNING PROJECTION LIGHT SOURCE FOR BARCODE DEVICE

(76) Inventor: Mei-Yen Wu, 5F, No. 2, Lane 48, Min-Tsu Rd., Hsin-Tien City, Taipei (TW)

( * ) Notice: Subject to any disclaimer, the term of this patent is extended or adjusted under 35 U.S.C. 154(b) by 0 days.

(21) Appl. No.: 09/758,185

(22) Filed: Jan. 12, 2001

(65) Prior Publication Data

US 2002/0092911 A1 Jul. 18, 2002

(51) Int. Cl.$^7$ ................................................ G06K 7/10
(52) U.S. Cl. ......................... 235/462.45; 235/462.32; 235/472.01; 359/894
(58) Field of Search ........................... 235/462, 472.01, 235/472.03; 359/894

(56) References Cited

U.S. PATENT DOCUMENTS

| | | | | |
|---|---|---|---|---|
| 4,408,120 A | * | 10/1983 | Hara et al. | 235/462 |
| 5,296,689 A | * | 3/1994 | Reddersen et al. | 235/467 |
| 5,304,788 A | * | 4/1994 | Metlitsky et al. | 235/467 |
| 6,324,019 B1 | * | 11/2001 | Takanashi et al. | 359/704 |

FOREIGN PATENT DOCUMENTS

JP 411015913 A * 11/1999 ............ G06K/7/10

* cited by examiner

*Primary Examiner*—Thien M. Le
*Assistant Examiner*—Daniel A. Hess
(74) *Attorney, Agent, or Firm*—Bacon & Thomas

(57) ABSTRACT

A scanning projection light source for a barcode device includes a laser diode, a converging lens located in front of the laser diode, a first photo mask located in front of the converging lens having a round aperture formed therein, and a second photo mask located in front of the first photo mask having a second aperture formed therein. The second aperture has two arched light blocking tabs located at two lateral sides for partly covering the round aperture. The laser diode emits a light spot to the converging lens which transforms the light spot to a parallel light beam. The parallel light beam is projected to the first photo mask through the round aperture to become a round light spot which passes through the second aperture and become an output light spot having arched tangent sides. The arched tangent sides are approximate to straight lines at a close distance and will result in a high resolution, and become arched tangent sides at a longer distance for scanning a lower resolution barcode.

4 Claims, 4 Drawing Sheets

SCANNING PROJECTION LIGHT SOURCE FOR BARCODE DEVICE

BACKGROUND OF THE INVENTION

This invention relates to an improvement of a scanning projection light source for a barcode device, and particularly to an improvement that is capable of generating projection light which has arched tangent sides for forming a desirable light source for scanning a barcode.

A good projection light source is essential for obtaining a desirable scanning result. The ideal projection light source condition is generally formed in a circular or elliptical manner. As most barcodes are printed in an elongated form, hence theoretically, the ideal scanning light spot for reading a barcode is square or rectangular. Elliptical is less desirable, and circular is even less desirable than elliptical. When using a circular or near-circular light spot to scan a barcode, the reflecting signal is close to a sinusoidal wave, which is not close to a digital signal. The circular light spot is relatively undesirable in the condition of reading the barcode by length and width dimension ratio. However, when scanning the barcode using a square or rectangular light spot, the reflecting signal is close to a square wave and is close to a digital signal, and therefore is more desirable for reading the barcode.

Another condition for reading a barcode within a given range is to make the projecting light parallel, and the size of the light spot should be suitable for reading the barcode. Hence most scanning type barcode readers now being used employ a laser light source. In order to make the product size compact, most of the products also use a laser diode (as shown in FIGS. 1 and 2). The following is an example of the construction.

The laser diode 1 is set to project out an elliptical light of 30 degrees in the X axis and 10 degrees in the Y the axis. In order to reach greater reading distance, a converging lens 2 is disposed to convert the light to become as parallel a light beam as possible. As mentioned before, the elliptical light source is not the most desirable light source, but the laser diode 1 projects light in an ellipse form. Hence to design and make an aspherical lens to match the elliptical light of the laser diode 1 is a very difficult and costly work. The resulting light spot has a large size and is not suitable for reading a barcode.

The outgoing light beam from the converging lens 2 is circular and almost parallel. But its size is too large. The light beam can be narrowed by projecting the output light beam through a round aperture 61 of a first photo mask 6 disposed in front of the lens 2. The resulting smaller light spot then may be deployed to project on an object (barcode).

Conventional photo masks now being used mostly have square or rectangular apertures. They have two flaws. One is that when a light beam passes through the narrow aperture, a photo grating effect will be generated. Another one is that an aperture that is too narrow will result in light beam distortion at a distance. These problems have been confirmed in experiments.

For resolving the aforesaid problems, there is a proposal which uses a cylindrical lens to generate a desirable narrow projecting light source. While it may pass through the narrow aperture without resulting in light spot distortion, it still cannot generate desirable resolution. Moreover, producing a glass cylindrical lens still has technical problems.

SUMMARY OF THE INVENTION

In view of aforesaid disadvantages, it is therefore an object of this invention to provide an improvement that uses two photo masks in front of a converging lens of a laser light source for producing the desirable results. According to this invention, the first photo mask is substantially constructed like the conventional one. In front of the first photo mask, a second photo mask is disposed which has a second aperture with two corresponding and curve-shaped light blocking side tabs. The laser light spot emitted by the laser diode projects on the converging lens to become a parallel outgoing light beam. The outgoing parallel light beam then passes through the round aperture of the first photo mask to become a small and round light spot. The round light spot then passes through the second aperture to form an output light spot which has arched tangent sides. The arched tangent side is approximate to a straight line at a close distance, but forms a clearer arched tangent side at a longer distance. Hence it may result in a higher resolution within a selected distance and may be used for scanning relatively a lower resolution barcode at a longer distance.

Another object of this invention is to provide four light blocking side tabs arranged in an up and down, and left and right, manner around the round aperture.

A still further object of this invention is that the tabs will cover approximately 1/6 to 1/8 of the area of the round aperture of the first photo mask.

BRIEF DESCRIPTION OF THE DRAWINGS

The invention, as well as its many advantages, may be further understood by the following detailed description and drawings, in which.

DESCRIPTION OF THE PREFERRED EMBODIMENT

Figure 1:
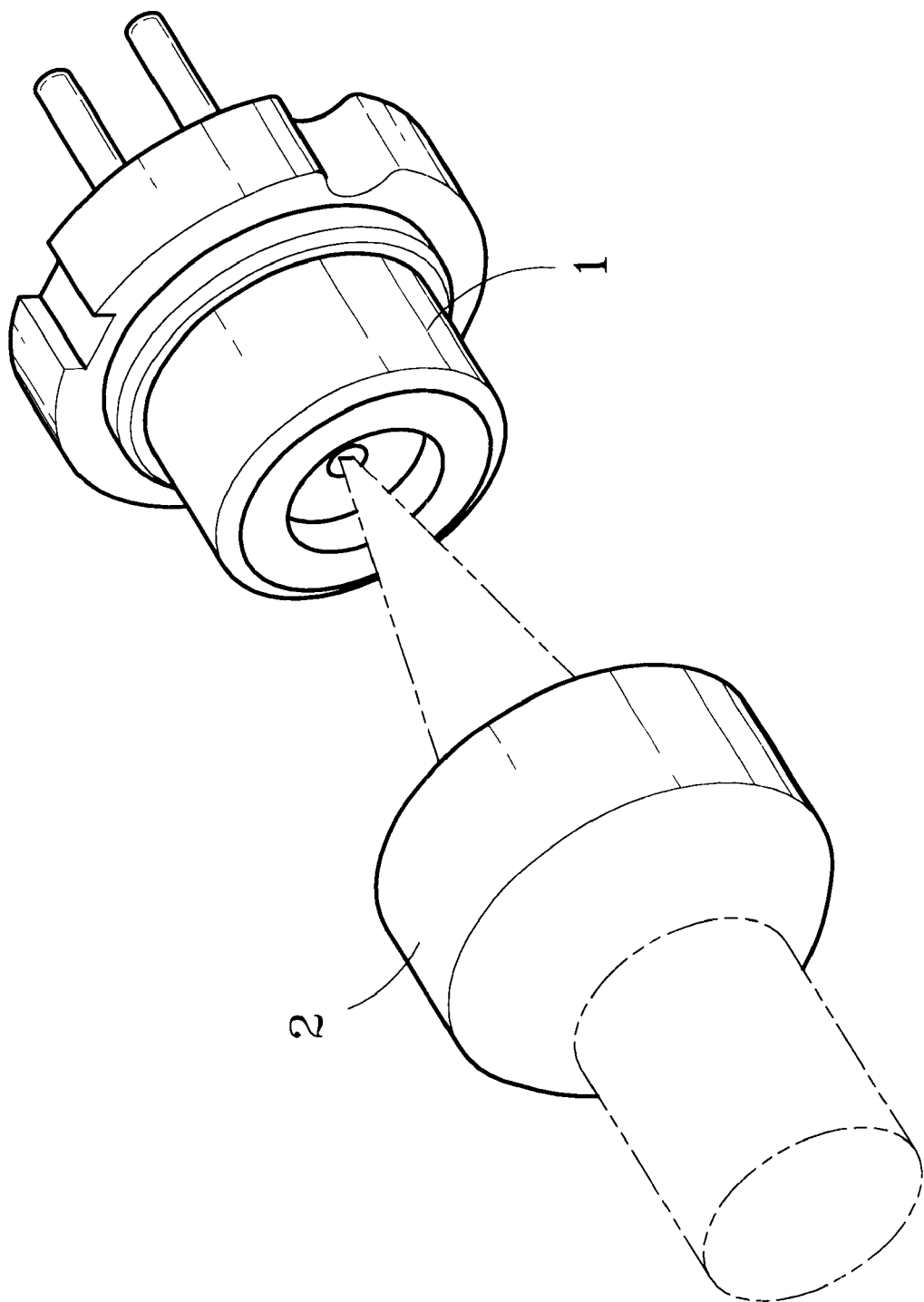
FIG. 1 is a schematic view of a conventional scanning projection light source.
Figure 2:
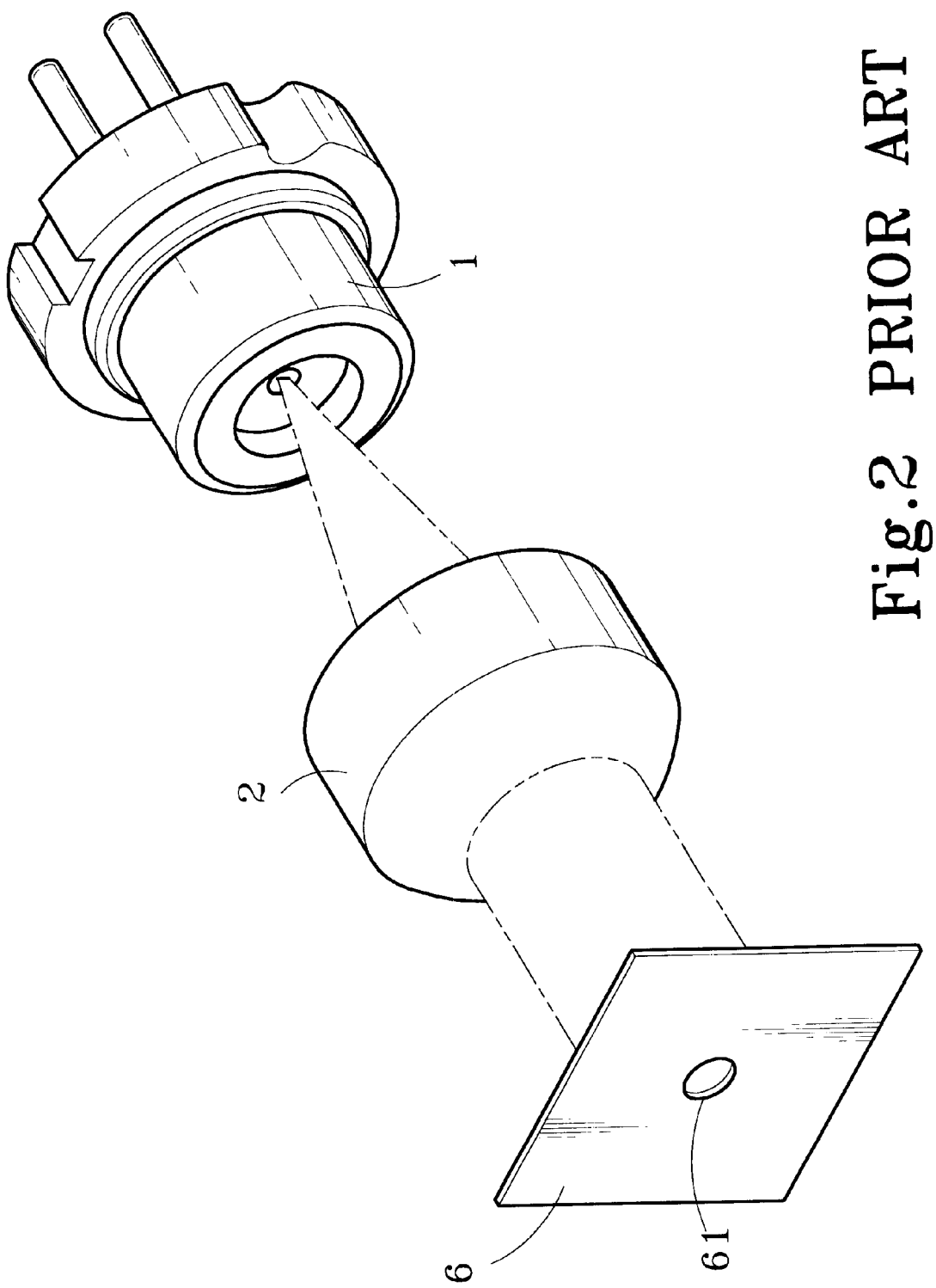
FIG. 2 is another schematic view of a conventional scanning projection light source.
Figure 3:
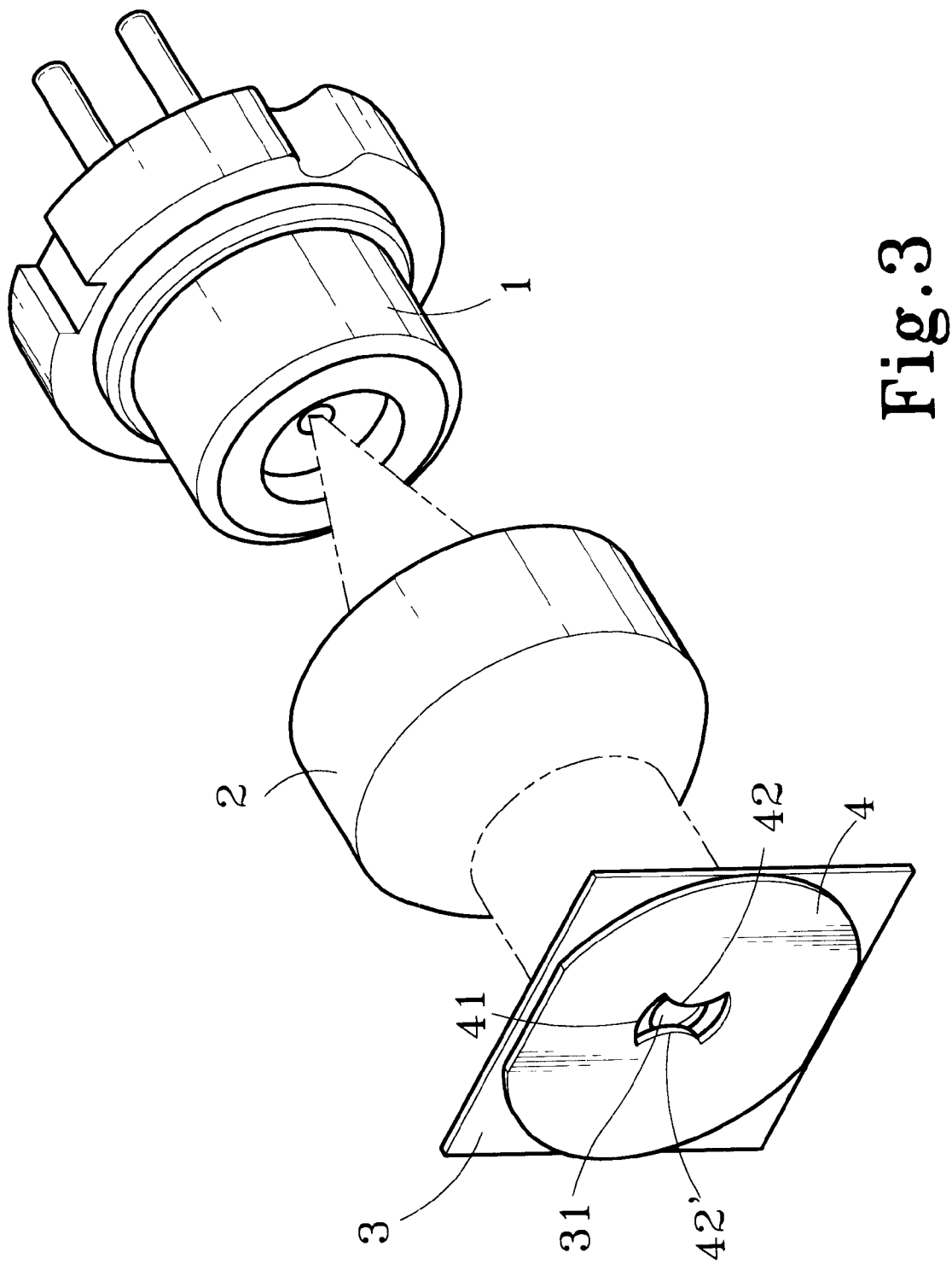
FIG. 3 is a schematic view of this invention

Referring to FIG. 3, the scanning projecting light source according to this invention includes a laser diode 1, a converging lens 2 located in front of the laser diode 1, a first photo mask 3 in front located of the converging lens 2 and a second photo mask 4 located in front of the first photo mask 3. This invention aims at generating a light source for projecting on a scanning object (barcode) without distortion at a distance that might otherwise happen when light passes through a narrow aperture (and resulting in halo or dispersing phenomenon).

The laser diode 1 has a light projection angle of 30 degrees at the X axis and 10 degrees at the Y axis to become an elliptical light spot and serves as the scanning light source for a barcode reading device (not shown in the figure).

The converging lens 2 receives and converts the projecting light from the laser diode I to become parallel light beam in an ellipse form.

The first photo mask 3 has a round aperture 31 for blocking the parallel light beam from the converging lens 2 and outputs a round shape light spot.

The second photo mask 4 has a second aperture 41 which has two corresponding arched shape light blocking tabs 42 and 42' formed at two lateral sides thereof. When the second photo mask 4 is disposed in front of the first photo mask 3, and has the second aperture 41 mating against the round aperture 31, each of the blocking tabs 42 and 42' will cover approximately 1/6–1/8 of the area of the round aperture 31.

Figure 4:
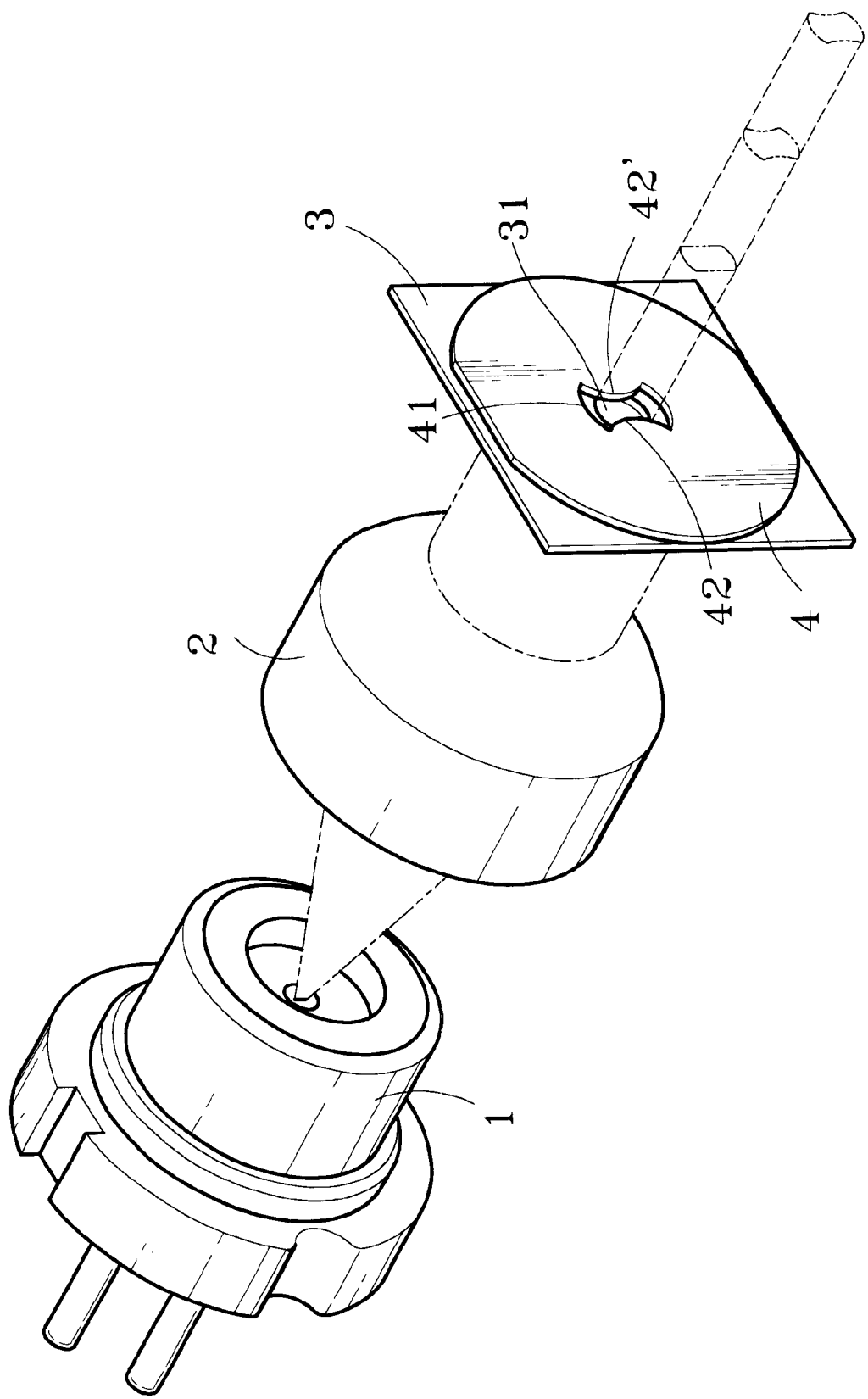
FIG. 4 is a schematic view of this invention in use.

Referring to FIGS. 3 and 4, when this invention is in use, the laser diode 1 emits an elliptical light spot which is converted to a parallel light beam after passing though the converging lens 2. The parallel light beam projects on the first photo mask 3 at the round aperture 31, and becomes a small and round exit light spot which travels through the second aperture 41 of the second photo mask 4 and is partly blocked by the arched light blocking tabs 42 and 42'. The outgoing light beam from the second photo mask 4 has arched tangent sides (according to light characteristics, when light beam passes through a tangent side, it does not have a clear cut side, and there is still some degree of diffusion and interference). The arched tangent side projection is approximate to a straight line at a close distance (as shown in FIG. 4) and may result in higher resolution. At a greater distance, the resulting light beam is more suitable for generating a relatively low resolution for reading the barcode.

While the embodiment set forth above has two light blocking tabs 42 and 42' for blocking light at two lateral sides of the round aperture 31, two more light blocking tabs may be added for blocking the round aperture 31 in an up and down, and left and right fashion.

What is claimed is:

1. An improvement of scanning projection light source for barcode device, comprising:

a laser diode for emitting a laser light spot;

a converging lens located in font of the laser diode for receiving and converting the laser light spot to a parallel light beam;

a first photo mask located in front of the converging lens having a round aperture for transforming the parallel light beam to become a projecting round light spot;

a second photo mask located in front of the first photo mask having a second aperture which has two light blocking tabs located at two lateral sides thereof for partly blocking the projecting round light spot to become an output light spot which has arched tangent sides;

wherein each arched tangent side approximates to a straight line at a selected distance close to the second photo mask for generating a higher resolution, and becomes an arched tangent side at a selected distance remote from the second photo mask for generating a lower resolution.

2. The improvement of scanning projection light source of claim 1, wherein each light blocking tab has an arched side.

3. The improvement of scanning projection light source of claim 1, wherein the second aperture has four light blocking tabs to partly cover the round aperture at the up, down, left and right portion thereof.

4. The improvement of scanning projection light source of claim 1, wherein each light blocking tab covers about 1/6 to 1/8 of the round aperture.

\* \* \* \* \*